(12) United States Patent
Maes (10) Patent No.: US 8,804,573 B2
(45) Date of Patent: Aug. 12, 2014

(54) METHOD AND SYSTEM FOR INFERRING PRESENCE OF A PRINCIPAL BASED ON PAST PRESENCE INFORMATION

(75) Inventor: Stephane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 366 days.

(21) Appl. No.: 11/424,451

(22) Filed: Jun. 15, 2006

(65) Prior Publication Data

US 2007/0291859 A1 Dec. 20, 2007

(51) Int. Cl.
*H04L 12/28* (2006.01)
*H04L 29/08* (2006.01)

(52) U.S. Cl.
CPC .......... *H04L 29/08684* (2013.01); *H04L 67/24* (2013.01)
USPC .......... 370/256; 370/352; 370/401; 709/204; 709/206; 709/217; 709/223; 709/224; 709/228; 709/246

(58) Field of Classification Search
USPC .......................................... 709/224; 370/256
See application file for complete search history.

(56) References Cited

U.S. PATENT DOCUMENTS

| | | | |
|---|---|---|---|
| 6,987,840 B1 | 1/2006 | Bosik et al. | |
| 7,035,390 B2 | 4/2006 | Elliott | |
| 7,203,294 B2 | 4/2007 | Carnazza et al. | |
| 7,269,162 B1 | 9/2007 | Turner | |
| 7,606,866 B2 | 10/2009 | Mora | |
| 7,620,160 B2 | 11/2009 | Tidwell et al. | |
| 7,668,157 B2 | 2/2010 | Weintraub et al. | |
| 2001/0031641 A1 | 10/2001 | Ung et al. | |
| 2002/0087649 A1 | 7/2002 | Horvitz | |
| 2003/0065788 A1* | 4/2003 | Salomaki | 709/227 |
| 2003/0206619 A1 | 11/2003 | Curbow et al. | |
| 2003/0217142 A1 | 11/2003 | Bobde et al. | |
| 2004/0002958 A1 | 1/2004 | Seshadri et al. | |
| 2004/0003042 A1 | 1/2004 | Horvitz et al. | |
| 2004/0030753 A1 | 2/2004 | Horvitz | |
| 2004/0039630 A1 | 2/2004 | Begole et al. | |
| 2004/0122901 A1 | 6/2004 | Sylvain | |
| 2004/0249776 A1* | 12/2004 | Horvitz et al. | 706/21 |
| 2005/0021645 A1 | 1/2005 | Kulkarni et al. | |

(Continued)

OTHER PUBLICATIONS

U.S. Appl. No. 11/383,817, filed May 17, 2006, Stephane H. Maes.

(Continued)

*Primary Examiner* — Faruk Hamza
*Assistant Examiner* — Aixa A Guadalupe-Cruz
(74) *Attorney, Agent, or Firm* — Kilpatrick Townsend & Stockton LLP (57) ABSTRACT

Systems, methods, and machine-readable media are disclosed for using past presence information to help determine a current presence of a principal. In one embodiment, determining presence of a principal on one or more devices or communication channels can comprise periodically querying a plurality of devices to determine a presence of the principal on one or more of the plurality of devices. An indication of the presence of the principal on the one or more of the plurality of devices can be received and presence information related to the indication of the presence of the principal on the one or more devices can be stored. A request for a presence of the principal can be received and, in response, the stored presence information can be retrieved. The stored presence information and, in some cases, current presence information can be provided in response to the request for the presence of the principal.

38 Claims, 8 Drawing Sheets

(56) References Cited

U.S. PATENT DOCUMENTS

| | | | |
|---|---|---|---|
| 2005/0080867 | A1 | 4/2005 | Malik et al. |
| 2005/0228882 | A1 | 10/2005 | Watanabe et al. |
| 2005/0259802 | A1 | 11/2005 | Gray et al. |
| 2005/0273673 | A1 | 12/2005 | Gassoway |
| 2006/0117050 | A1* | 6/2006 | John et al. ............ 707/101 |
| 2006/0190117 | A1 | 8/2006 | Weczorek et al. |
| 2006/0248185 | A1 | 11/2006 | Morris |
| 2007/0027921 | A1 | 2/2007 | Alvarado et al. |
| 2007/0081640 | A1* | 4/2007 | Jachner ............ 379/88.16 |
| 2007/0153709 | A1 | 7/2007 | Choi |
| 2007/0162343 | A1 | 7/2007 | Landesmann |
| 2007/0233859 | A1* | 10/2007 | Zhao et al. ............ 709/224 |
| 2008/0034367 | A1 | 2/2008 | Patrick et al. |
| 2008/0040441 | A1 | 2/2008 | Maes |
| 2008/0313329 | A1 | 12/2008 | Wang et al. |
| 2009/0177601 | A1 | 7/2009 | Huang et al. |
| 2011/0142209 | A1 | 6/2011 | Maes |
| 2011/0185029 | A1 | 7/2011 | Jain et al. |
| 2013/0239182 | A1 | 9/2013 | Pierson et al. |

OTHER PUBLICATIONS

E-Mail Notification, Open Mobile Alliance Ltd., Candidate Version 1.0, Jun. 14, 2004, 21 pages.

Graham, Steve et al., Publish-Subscribe Notification for Web services, Akamai Technologies et al., Version 1.0, Mar. 5, 2004, 19 pages.

Leion, Henrik, Presence Aware Software Using SIP, White Paper, Enea Epact AB, Teknikringen 8 SE-58330 Linkoping, Feb. 2005, 10 pages.

Synchronizing and Managing Mobile Devices, iAnywhere Solutions, Inc., One Sybase Drive, Dublin, CA 94568-7902, www.iAnywhere.com, 8 pages.

Understanding SIP, Today's Hottest Communications Protocol Comes of Age, White Paper, Ubiquity Software Corporation, Limited, www.ubiquitysfotware.com, 2004, 6 pages.

U.S. Appl. No. 11/481,440, filed Jul. 5, 2006, Advisory Action dated Mar. 4, 2010, 3 pages.

U.S. Appl. No. 11/481,440, filed Jul. 5, 2006, Final Office Action dated Dec. 9, 2009, 12 pages.

U.S. Appl. No. 11/481,440, filed Jul. 5, 2006, Office Action dated May 10, 2010, 15 pages.

U.S. Appl. No. 11/481,440, filed Jul. 5, 2006, Office Action dated May 11, 2009, 13 pages.

U.S. Appl. No. 11/481,440, filed Jul. 5, 2006, Final Office Action dated Dec. 14, 2010, 20 pages.

U.S. Appl. No. 11/481,440, filed Jul. 5, 2006, Advisory Action dated Feb. 23, 2011, 2 pages.

U.S. Appl. No. 11/481,440, filed Jul. 5, 2006, Office Action dated Jun. 1, 2011, 19 pages.

U.S. Appl. No. 11/481,440, filed Jul. 5, 2006, Final Office Action dated Nov. 8, 2011, 18 pages.

U.S. Appl. No. 12/957,709, filed Dec. 1, 2010, Non-final Office Action dated Dec. 18, 2012, 32 pages.

U.S. Appl. No. 11/481,440, filed Jul. 5, 2006, Notice of Allowance dated Nov. 13, 2013, 27 pages.

U.S. Appl. No. 12/957,709, filed Dec. 1, 2010, Advisory Action dated Sep. 17, 2013, 5 pages.

U.S. Appl. No. 12/957,709, filed Dec. 1, 2010, Non-Final Office Action dated Dec. 5, 2013, 9 pages.

U.S. Appl. No. 12/957,709, Final Office Action mailed on Jun. 26, 2013, 19 pages.

U.S. Appl. No. 12/957,726, Non-Final Office Action mailed on Oct. 3, 2013, 12 pages.

\* cited by examiner

METHOD AND SYSTEM FOR INFERRING PRESENCE OF A PRINCIPAL BASED ON PAST PRESENCE INFORMATION

BACKGROUND OF THE INVENTION

Embodiments of the present invention relate generally to determining a presence of a user on a device and/or network and more particularly to using past presence information to help determine a current presence of a user.

Presence can be defined as the technology and information that makes it possible to locate and identify a computing device or, in general, a principal. A principal can be defined as an entity that has an identity, that is capable of providing consent and other data, and to which authenticated actions are done on its behalf. Therefore, a principal may be a computing device but it may also be a person across multiple computing devices or even an organization, a service, or a group of persons. Presence can be further defined as a transient state of a principal that can be used by other entities to make a decision, in real-time, about how to best communicate with the principal. For example, user A can be subscribed to the presence of user B via a presence service. If user A wants to communicate with user B at a given instant, he can make a decision in real-time depending upon the presence information of B, that is, user A can decide how and where to communicate with user B based on user B's presence information at the time. For example, the users can have a web-conference at that instant if B is available or schedule a web conference at a later time, send an SMS, email, etc. The resulting communication may not be immediate, e.g. a decision may be made based on the presence information to send an email or leave a voice mail.

Presence is typically obtained by interrogating a service provided by a service provider to determine whether a particular device is currently present. Various systems and communications networks are able to provide current presence information related to users of those systems and/or networks. Today presence is typically available as part of another communication application like IM (Instant messaging), voice chat (e.g. SKYPE) or push to Talk over cellular (PoC). For example, an IM client can detect presence based on keyboard activity etc. Similarly, a cellular or other telephone service can detect presence based on a condition of a telephone, e.g., the phone being "off-hook".

Determinations of presence are instantaneous, i.e., they are made in real-time or near real-time with the believe that they are made in real time. Real time presence is presence collected about the principal that describes, for example, user-defined status as provided by the user (on, available, busy, etc.), registration, data and call state that can be captured from the network, application state such as channel and/or device from where the presence was collected (e.g. Web, desktop, phone, mobile), etc. Because of the use of presence in a multitude of applications, it is of great interest to separate the presence from the application that uses it and to aggregate multiple sources of presence and make it available to subscribers of the presence service or allow that presence service to be queried.

However, other information related to a principal's presence beside a current, real-time presence may also be useful in determining how or where to contact that principal. For example, recent activity may be useful as hints to a principal's current presence or availability. However, no current systems or networks consider a principal's past usage to determine presence. Rather, these systems and/or networks rely solely on a principal's current presence or status. Hence, there is a need for methods and systems that allow for using past presence information to help determine a current presence of a principal.

BRIEF SUMMARY OF THE INVENTION

Systems, methods, and machine-readable media are disclosed for using past presence information to help determine a current presence of a principal. In one embodiment, a method of determining presence of a principal on one or more devices or communication channels can comprise periodically querying a plurality of devices to determine a presence of the principal on one or more of the plurality of devices. Querying the plurality of devices can comprise querying a plurality of end devices, querying a plurality of servers, etc. Querying the plurality of devices can include any model of trying to reach a device, set of device, set of access channels used by a principal, etc. to see if the device or principal will answer or react. This may include querying presence servers or any server or service that is or may interact with the principal and therefore keep track of the interaction.

An indication of the presence of the principal on the one or more of the plurality of devices can be received and presence information related to the indication of the presence of the principal on the one or more devices can be stored, for example, in a presence server. Storing presence information related to the indication of the presence of the principal can comprise storing a time at which the presence of the principal was received or last updated and/or storing an identification of the one or more devices as well as other possible information. Any information that may be in an attribute of interest to the presence server, the principal, or a requester may be stored. For example, the principal may, through personal preferences, policies, privacy rules, etc., determine what can be stored and/or requested about him. The service provider or administrator of the presence server can also set filtering rules etc. to determine what attribute is available and to which requesters. In some cases, the requestor may decide what attribute to ask and, for example, a presence server may decide to store or build attributes that are requested (i.e. add one if a new one is requested) or the requestor can sign up or subscribe with a presence server owner or service provider to have the necessary attributes stored or acquired.

The method can further comprise receiving a request for a presence of the principal and retrieving the stored presence information. The stored presence information can then be provided in response to the request for the presence of the principal. In some cases, the method can also include determining a current presence for the principal. In such a case, the stored presence information and the current presence can be provided in response to the request for the presence of the principal. According to one embodiment, changes and/or updates to the stored presence information (i.e. the past presence information) can be treated like any other presence information. Therefore, whenever there is an update of some of the information it can be published and/or a notification can be sent to all the other principals who have subscribed to presence information for that principal up to whatever applicable filters or policies may allow.

According to one embodiment, the method can further comprise determining a relevance of the stored presence information and providing the relevance with the stored presence information in response to the request for the presence of the principal e.g., as additional presence attribute values. Determining the relevance of the stored presence information can be, for example, based on a time since the stored presence information was received or any other policy i.e., any combination of conditions and actions, running when the presence information is retrieved or sent. The policies can be set by principals, requesters or by presence server administrator. Additionally or alternatively, determining the relevance of the stored presence information can be based on a device type for each of the one or more of the plurality of devices. Once determined, the stored presence information can be ordered based on relevance. According to one embodiment, the presence server may periodically, based on triggers or timers set when first collecting the presence data or based on some other condition(s), determine by that some stored presence information is expired or no longer relevant. In such a case, the presence server may remove or expire the information and notify principals subscribing to that information.

According to another embodiment of the present invention, a system for determining presence of a principal on one or more devices or communication channels can comprise a repository and a presence enabler communicatively coupled with the repository. The presence enabler can be adapted to periodically query a plurality of devices to determine a presence of the principal on one or more of the plurality of devices. Querying the plurality of devices can comprise querying a plurality of end devices, querying a plurality of servers. In some cases, the presence server or storage may be implemented directly by the requester or application that will use the presence information thereby eliminating the need for a different presence server provided by a third party. Alternatively, querying the plurality of devices can include making a request to services exposed by network operators.

The presence enabler can also be adapted to receive an indication of the presence of the principal on the one or more of the plurality of devices and store presence information related to the indication of the presence of the principal in the repository. The stored presence information related to the indication of the presence of the principal can comprise a time at which the presence of the principal was received and/or an identification of the one or more devices as well as other possible information.

The presence enabler can be further adapted to receive a request for a presence of a principal and retrieve the stored presence information from the repository. The presence enabler can then provide the stored presence information in response to the request for the presence of the principal as well as provided as part of the presence one or more presence attributes that can also be subscribed to and will then be provided to the subscriber(s). In some cases, the presence enabler can be further adapted to determine a current presence for the principal. In such a case, the presence enabler can be further adapted to provide the stored presence information and the current presence in response to the request for the presence of the principal.

According to one embodiment, the presence enabler can be further adapted to determine a relevance of the stored presence information and provide the relevance with the stored presence information in response to the request for the presence of the principal. In such a case, the presence enabler can determine the relevance of the stored presence information based on a time since the stored presence information was received. Alternatively or additionally, the presence enabler can determine the relevance of the stored presence information based on a device type for each of the one or more of the plurality of devices. In some cases, the presence enabler can be further adapted to order the stored presence information based on relevance.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for determining presence of a principal on one or more devices or communication channels, i.e., networks, devices, etc. Generally speaking, embodiments of the present invention can utilize current, i.e., real-time, presence information as well as past presence information to determine a presence of a principal. That is, since recent activity may be useful as hints to presence or availability, embodiments of the present invention utilize previously collected presence information as well as current presence information. For example, presence of a principal on his office phone detected five minutes ago, but not right now, may provide a hint that can lead to a safe assumption of his current presence. In another example, an SMS message sent from a cell phone recently or an email sent from a laptop recently can provide valuable information as to presence even if not indicated by current presence.

Therefore, embodiments of the present invention utilize past present hints that can be captured by presence server or presence enabler and used by principals or other applications. As used herein a past presence hint is defined as real time presence information captured at a given moment and not refreshed since. That is, a past presence hint is presence information that was, at the time it was collected, real-time or current presence information but is now saved as a record of past presence. Examples of past presence hints can include, but are not limited to results of a past query of a presence network, server, agent, etc. or other presence information captured because of principal activities that indicated his presence on a communication channel or device but for which no new activities have been received since.

Generally speaking, determining presence of a principal on one or more devices or communication channels according to one embodiment of the present invention can comprise periodically querying a plurality of devices to determine a presence of the principal on one or more of the plurality of devices. An indication of the presence of the principal on the one or more of the plurality of devices can be received and presence information related to the indication of the presence of the principal on the one or more devices can be stored. A request for a presence of the principal can be received and, in response, the stored presence information can be retrieved. The stored presence information can then be provided in response to the request for the presence of the principal. A current presence for the principal can also be determined. In such a case, the stored presence information and the current presence can be provided in response to the request for the presence of the principal.

Importantly, it should be noted that embodiments of the present invention may be implemented in a wide variety of environments and on a wide variety of devices and/or systems. Therefore, the following exemplary environments and systems are offered for illustrative purposes only and should not be considered limiting on the wide variety of possible implementation of the various embodiments of the present invention.

Figure 1:
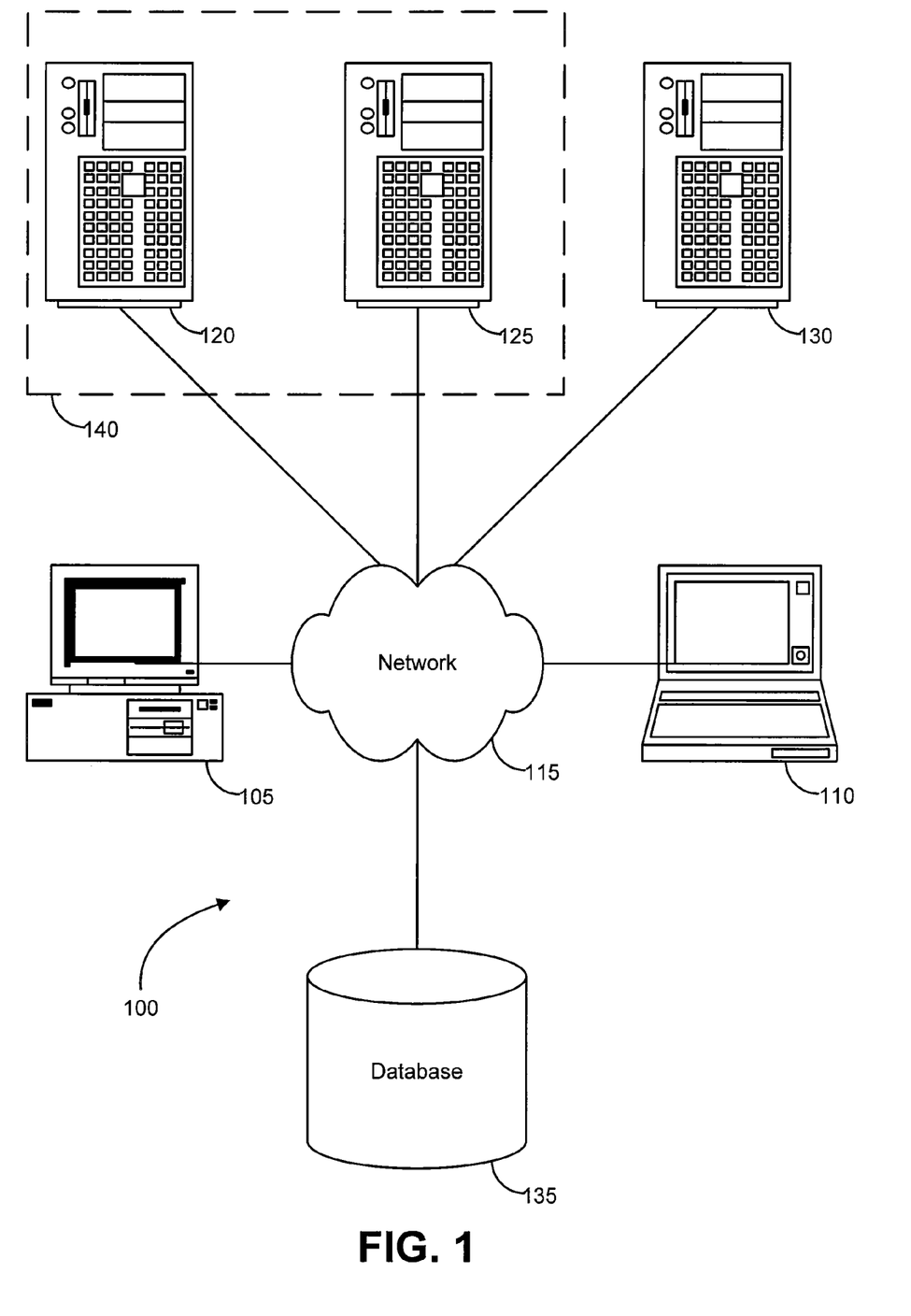
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
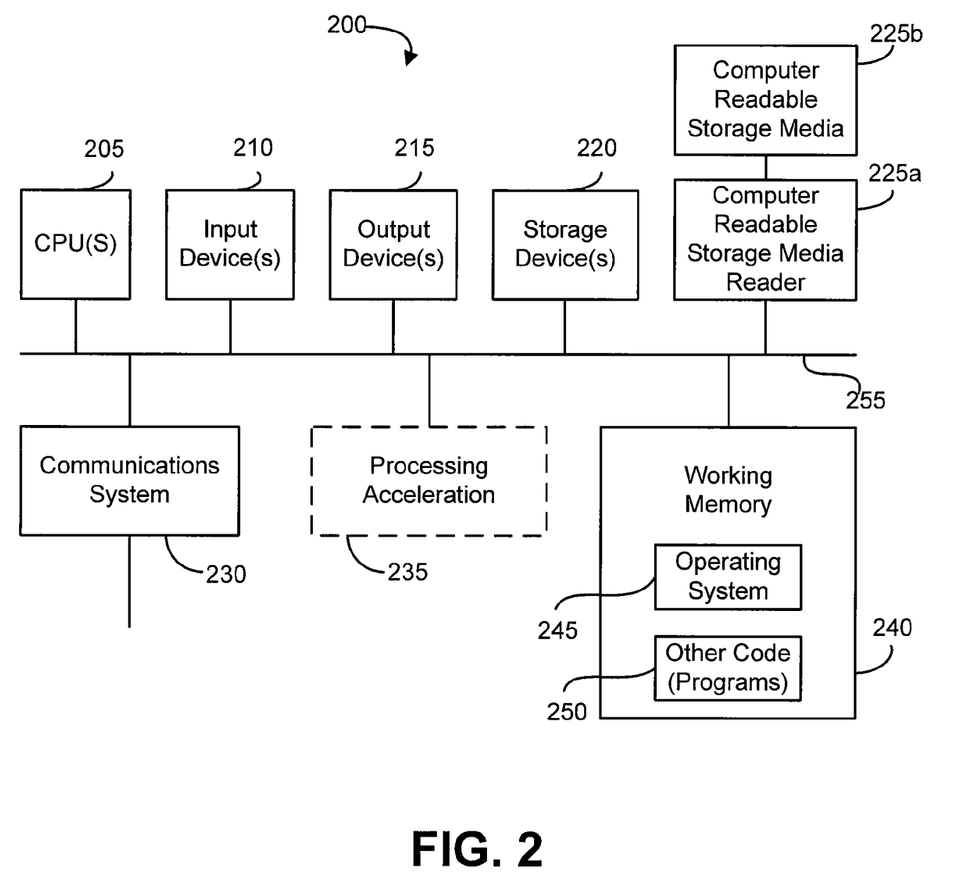
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 400 may include code 450 for implementing processes for dynamically providing multimodal and/or multi-device configuration and support.

Figure 3:
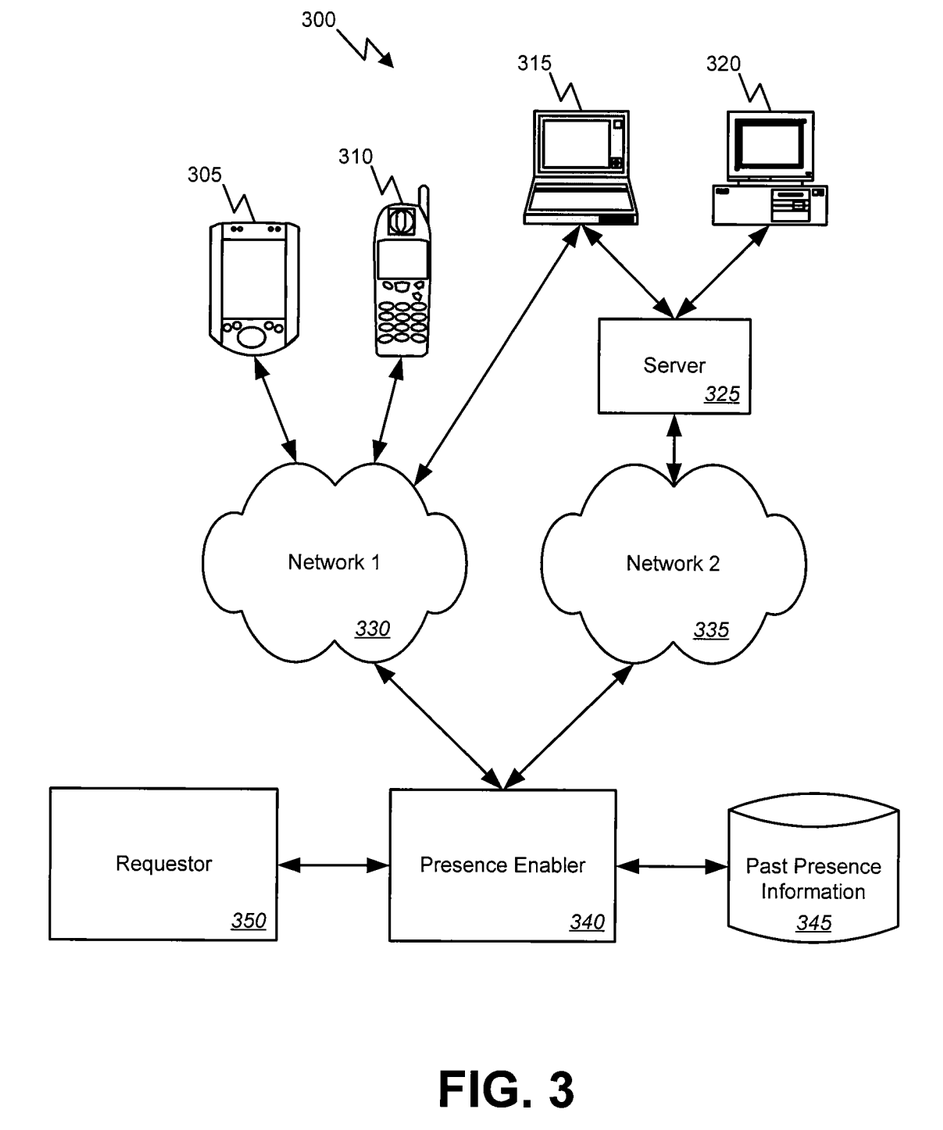
FIG. 3 is a block diagram illustrating, at a high level, a system for determining presence of a principal on one or more devices according to one embodiment of the present invention.

FIG. 3 is a block diagram illustrating, at a high level, a system for determining presence of a principal on one or more devices according to one embodiment of the present invention. In this example, the system 300 includes a number of devices such as end devices 305-320. The devices 305-320 can be communicatively coupled with one or more networks 330 and 335 either directly or via one or more servers 335. Some devices 315 may in fact be coupled with or have the ability to be coupled with more than one network 330 and 335 either at the same or different times. Additionally, it should be noted that a wide variety of different device types and/or combination of device types may be used and embodiments of the present invention are not limited to use with any specific types of devices 305-320.

The system 300 can also include a presence enabler 340. While referred to herein as an agent, it should be noted that presence enabler 340 may in fact be a presence server/enabler or any other device or application capable of determining presence of a principal on one or more of the devices 305-320 and/or networks 330 and 335. Presence enabler 340 can be communicatively coupled with the one or more networks 330 and 335 and be used to determine a presence of a principal on one or more of the devices 305-320 and/or networks 330 and 335.

Presence enabler 340 can also be communicatively coupled with a repository of past presence information 345. As will be seen, the past presence information can be accumulated by the presence enabler 340 and used by the presence enabler 340 to respond to requests for a principal presence. Importantly, it should be noted that, while the repository of past presence information 345 is show in this example as being separate from the presence enabler 340, the repository of past presence information 345 may in fact be part of the presence enabler 340 or may be maintained in or by any other physical and/or logical location and/or device.

Regardless of the exact configuration, the presence enabler 340 can be adapted to periodically query the devices 305-320 and/or servers 325 to determine a presence of the principal on one or more of the plurality of devices 305-320. The presence enabler 340 can also be adapted to receive an indication of the presence of the principal on the one or more of the plurality of devices 305-320 and store presence information related to the indication of the presence of the principal on the one or more devices in the repository of past presence information 345. The stored past presence information 345 related to the indication of the presence of the principal can comprise, for example, a time at which the presence of the principal was received, an identification of the one or more devices 305-320, as well as other possible information.

The presence enabler 340 can also communicatively coupled with a requester 350 such as a user, a server, an application, etc. The presence enabler 340 can be further adapted to receive a request for a presence of a principal from the requestor 350. In response to this request, the presence enabler 340 can retrieve the stored past presence information 345 from the repository. The presence enabler 340 can then provide the stored presence information to the requestor 350 in response to the request for the presence of the principal. In some cases, the presence enabler 340 can also determine a current presence for the principal. That is, in addition to providing past presence information from the repository of past presence information 345, the presence enabler can collect real-time presence information from the various devices 305-320, servers 325, and/or networks 330 and 335 at the time of the request. In such a case, the presence enabler 340 can be further adapted to provide the stored presence information and the current presence in response to the request for the presence of the principal.

According to one embodiment, the presence enabler 340 can be further adapted to determine a relevance of the stored presence information and provide the relevance with the stored presence information in response to the request for the presence of the principal. In such a case, the presence enabler 340 can determine the relevance of the stored presence information based, for example, on a time since the stored presence information was received or any other policy, script, or consideration. Alternatively or additionally, the presence enabler 340 can determine the relevance of the stored presence information based on a device type for each of the one or more of the plurality of devices 305-320. In some cases, the presence enabler 340 can be further adapted to order the stored presence information based on relevance, either as it is stored, as it is returned to the requester 350 or subscribers, or at some other time. According to one embodiment, triggers, timers, etc can be used to control or initiate when the presence information is collected. Additionally or alternatively, these or other timers or other conditions can be used by the presence enabler to determine when stored presence information is expired or no longer valid. In such a case, presence information that has exceeded a period of validity or otherwise been determined by the presence enabler 340 to be invalid can be deleted and subscribers to that information can be notified.

So, in use, the presence enabler 340 aggregates different sources of presence, i.e., the devices 305-320, the servers 325, and/or the networks 330-335 For example, the presence enabler can collect (i.e., subscribe to) IM, PoC, voice chat or, other presence information for principals and/or can query (or subscribe to) network presence information via Parlay, Parlay X or similar presence calls if authorized. Furthermore, users and/or applications can, via the presence enabler 340, subscribe to the presence service. Once subscribed, the presence enabler 340 starts sending the present status of the principals on the roster if authorized. For users that have registered one or multiple mobile devices, the presence enabler 340 queries the different devices (e.g., via a Parlay or similar web service, APIs, etc.) to update the presence status. This presence status can be stored in the repository of past presence information and/or can be provided to a requestor 350 seeking presence information for a principal on the roster of the presence enabler 340.

As noted above, the past presence information provided to the requestor 350 can have an associated time stamp indicating when the presence information was collected and any other relevant information. This may be used to, for example, expire or age the past presence information. In another example such as in a follow me or find me service, depending on how old the hint is, it may be used, if recent enough, to try to contact the principal even if current presence is not indicated. In yet another example, old or expired presence information may cause the requester and/or presence enabler 340 to request a refresh of that presence (e.g. with an extension of current protocols or simply by appearing as it disconnected and reconnected to the presence server).

Figure 4:
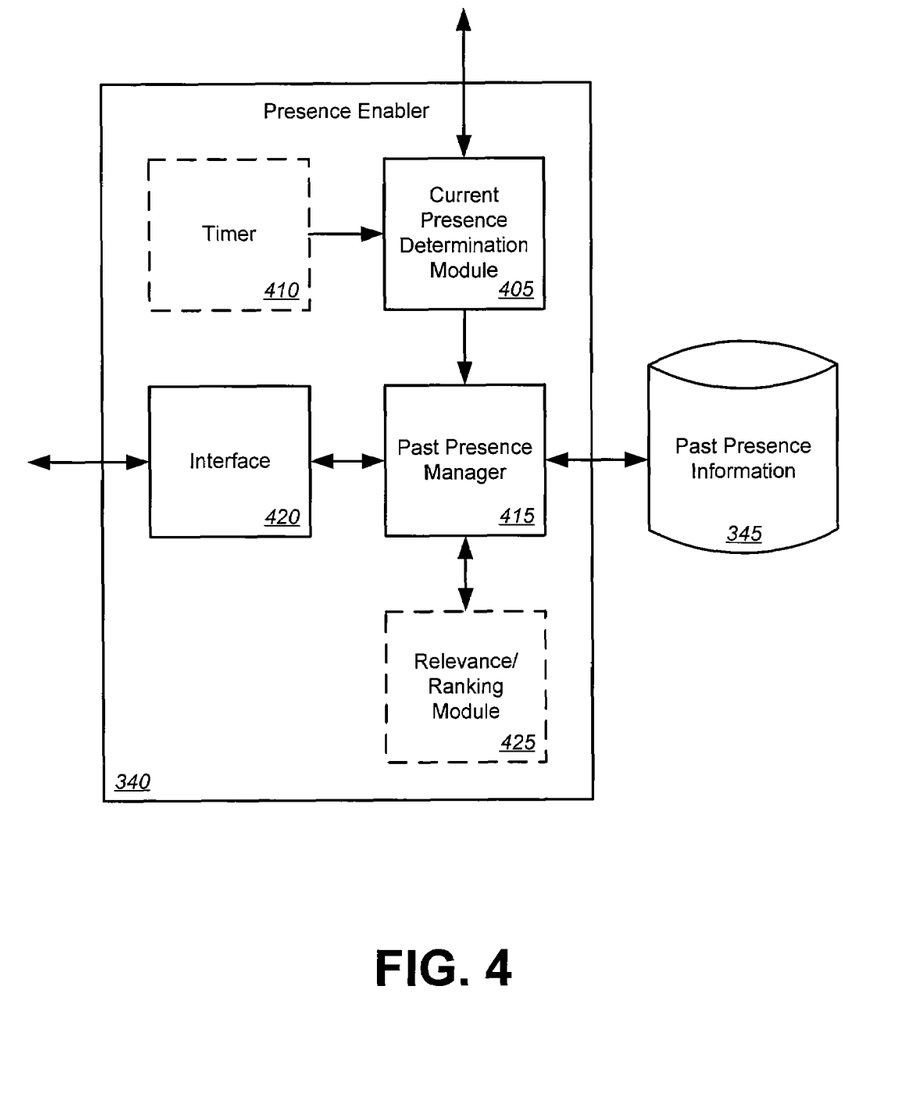
FIG. 4 is a block diagram illustrating exemplary functional components of a presence enabler according to one embodiment of the present invention.

FIG. 4 is a block diagram illustrating exemplary function of a presence enabler according to one embodiment of the present invention. This example illustrates the repository of past presence information 345 and the presence enabler 340 communicatively coupled with the repository 345. As noted above, the presence enabler 340 can be adapted to periodically query a plurality of devices to determine a presence of the principal on one or more of the plurality of devices. Therefore, the presence enabler may optionally include a timer 410 or other module for triggering the periodic queries. The decision to start querying may come from having a requestor asking for presence information or a subscriber subscribing to it. According to one embodiment, the attempt to refresh the presence information takes place only when a new request comes in or based on another external consideration.

Additionally, the presence enabler can include a current presence module 405 for determining the current presence of a principal on one or more end devices in a conventional manner and as discussed above. The presence enabler 340 can also be adapted to receive, via the current presence determination module 405, an indication of the presence of the principal on the one or more of the plurality of devices and store presence information related to the indication of the presence of the principal on the one or more devices in the repository 345 via past presence manager 415. The past presence manager can, for example, store presence information related to the indication of the presence of the principal with a time stamp indicating a time at which the presence of the principal was received and/or an identification of the one or more devices as well as other possible information. Alternatively or additionally, any other information can be stored and any approach can be used to determine what presence information is expired and what is not.

The presence enabler 340 can be further adapted to receive, via an interface 420 such as an Application Program Interface (API), web service, or other type of interface, a request for a presence of a principal. In response, the past presence manager 415 can retrieve the stored presence information from the repository 345. The presence enabler 340 can then provide the stored presence information in to the requestor via the interface 420. In some cases, the presence enabler 340 can be further adapted to determine a current presence for the principal. In such a case, the presence enabler 340 can be further adapted to provide the stored presence information and the current presence, determined by current presence determination module 405, in response to the request for the presence of the principal. So, as noted above, the presence enabler can combine both conventional presence information, i.e., real-time presence information and stored presence information.

According to one embodiment, the presence enabler 340 can be further adapted to determine, via relevance/ranking module 425, a relevance of the stored presence information and provide the relevance with the stored presence information in response to the request for the presence of the principal. In such a case, the relevance/ranking module 425 can determine the relevance of the stored presence information based on a time since the stored presence information was received. Alternatively or additionally, the relevance/ranking module 425 can determine the relevance of the stored presence information based on a device type for each of the one or more of the plurality of devices. In some cases, the relevance/ranking module 425 can be further adapted to order the stored presence information based on relevance. The presence user agent or requester can use both the current, real-time presence information and the stored presence information, including relevance attributes etc, and display the relevance attribute or use them to decide what to display or to decide how to communicate with the intended recipient(s).

Figure 5:
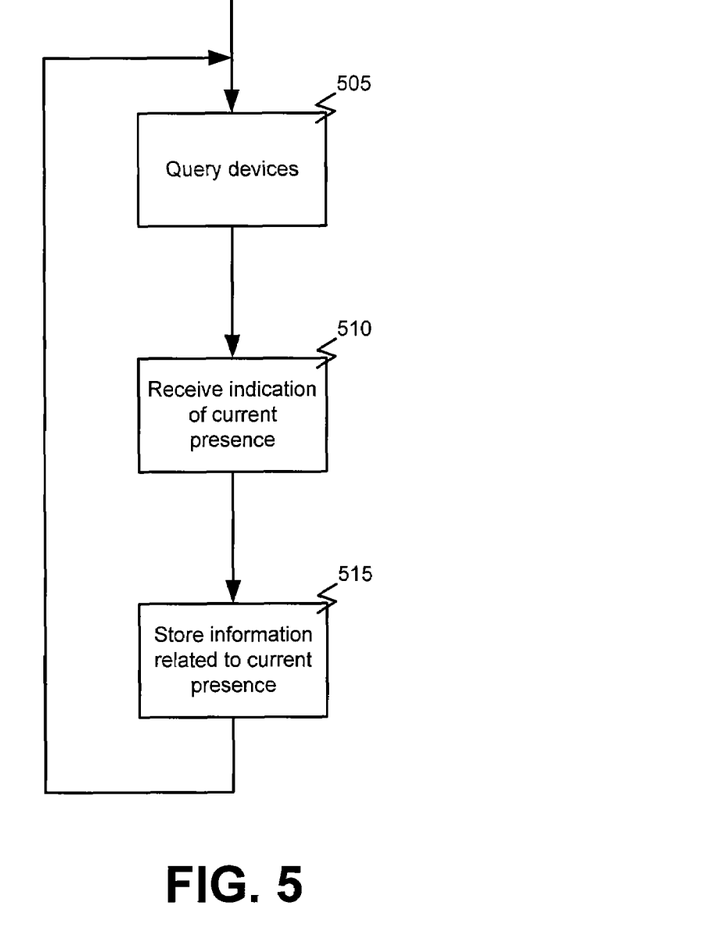
FIG. 5 is a flowchart illustrating a process for collecting and maintaining past presence information according to one embodiment of the present invention.

FIG. 5 is a flowchart illustrating a process for collecting and maintaining past presence information according to one embodiment of the present invention. In this example, the process begins with periodically querying 505 a plurality of devices or communication channels to determine a presence of the principal on one or more of the plurality of devices or communication channels. That is, as discussed above, the presence enabler, presence server, or other device or application can periodically, based on a timer or some other event or trigger or other model, collect presence information for principal's subscribing to the presence service, i.e., for principals in a presence service roster. Querying 505 the plurality of devices can comprise querying a plurality of end devices, querying a plurality of servers, etc in the conventional manner. In addition, the presence enabler can receive presence updates from a presence source in the conventional manner.

In response to the query 505, an indication of the presence of the principal on the one or more of the plurality of devices, channels of communications, locations, etc. can be received 510 and presence information related to the indication of the presence of the principal on the one or more devices can be stored 515, for example in a repository of past presence information as discussed above. Storing 515 presence information related to the indication of the presence of the principal can comprise storing a time at which the presence of the principal was received and/or storing an identification of the one or more devices as well as other possible information such as a principal identifier or other indication of the principal. That is, a time stamp or other indication of the time at which the presence information was collected can be saved with the presence information. Additionally, an indication, such as an address, device identifier, communication channel, way that the presence has been inferred, etc., of the device on which the principal was located may also be saved.

Figure 6:
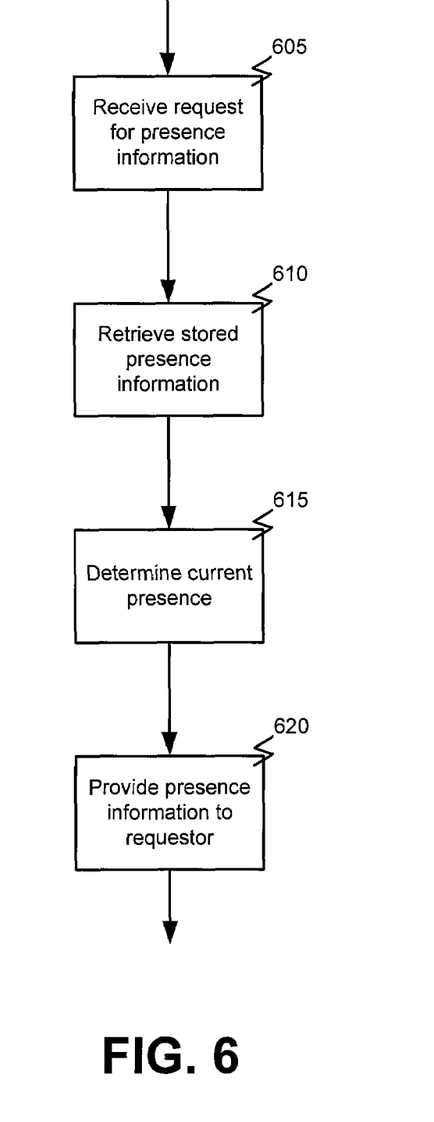
FIG. 6 is a flowchart illustrating a process for using past presence information according to one embodiment of the present invention.

FIG. 6 is a flowchart illustrating a process for using past presence information according to one embodiment of the present invention. In this example, the process begins with receiving 605 a request for a presence of the principal. That is a request for presence information may be received from a requestor attempting to locate of contact a particular principal that is a subscriber to the presence service offered by the presence enabler as discussed above.

In response to the request, the stored presence information related to the principal indicated in the request can be retrieved 610 from, for example the repository of past presence information described above. Also, a current presence for the principal can also be determined 615. That is, in addition to the saved past presence information, the presence enabler, presence server, or other device or application can, as discussed above, collect real-time presence information for principal indicated in the request by querying the plurality of devices in the conventional manner.

Finally, the stored presence information and the current presence can be provided 620 in response to the request for the presence of the principal. That is, the presence enabler, presence server, or other device or application can respond to the request for presence information for a principal with saved past presence information as well as real-time presence information for the principal indicated in the request.

Figure 7:
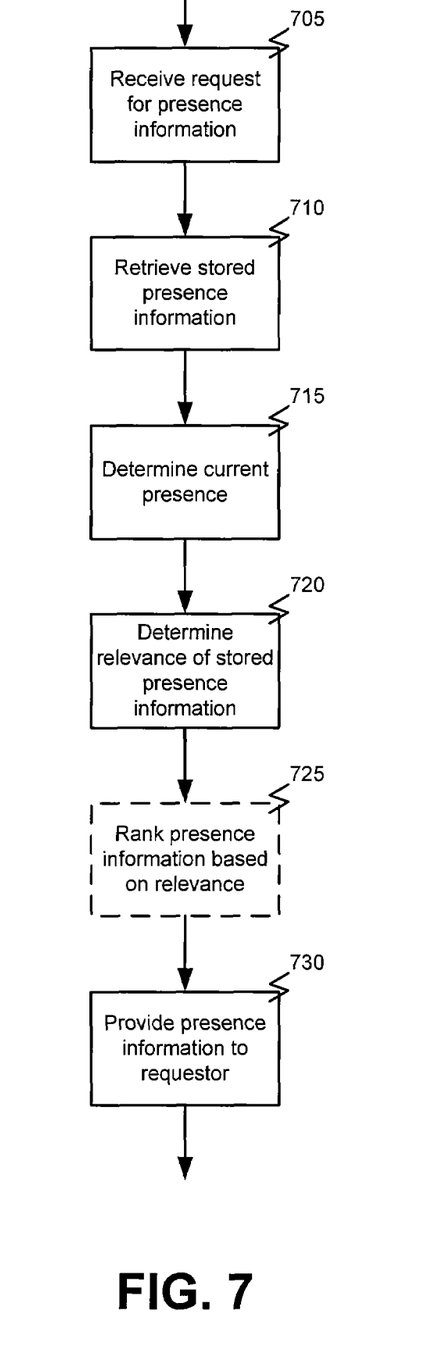
FIG. 7 is a flowchart illustrating a process for using past presence information according to another embodiment of the present invention.

FIG. 7 is a flowchart illustrating a process for using past presence information according to one embodiment of the present invention. In this example, as with the previous example, the process begins with receiving 705 a request for a presence of the principal and retrieving 710 the stored presence information. A current presence for the principal can also be determined 715.

In this example, a relevance of the stored presence information can be determined 720. Determining 720 the relevance of the stored presence information can be, for example, based on a time since the stored presence information was received. Additionally or alternatively, determining the relevance of the stored presence information can be based on a device type for each of the one or more of the plurality of devices.

Optionally, the stored presence information can be ordered or ranked 725 based on the relevance. That is, as noted above, the stored past presence information can be order or ranked, as it is stored or prior to being supplied to a requestor, based on its relevance, i.e., based on its age determined, for example, from time stamps indicating when the information was collected or based on other factors. Furthermore, the relevance can be provided as an attribute of the presence information and passed to a requestor or presence subscriber to make decisions as described above.

Finally, the stored presence information, the current presence, and optionally the relevance information can be provided 730 in response to the request for the presence of the principal. That is, the presence enabler, presence server, or other device or application can respond to the request for presence information for a principal with saved past presence information as well as real-time presence information for the principal indicated in the request. Furthermore, the past presence information can be provided with an indication of its relevance based on a number of factors as discussed above. Furthermore, in some cases, the past presence information can be ordered or ranked based on this relevance. So, for example, the requestor can display or otherwise present such information to a principal in an easy to read format. Alternatively or additionally, the requester may be adapted to utilize such information in selection of a device to contact.

Figure 8:
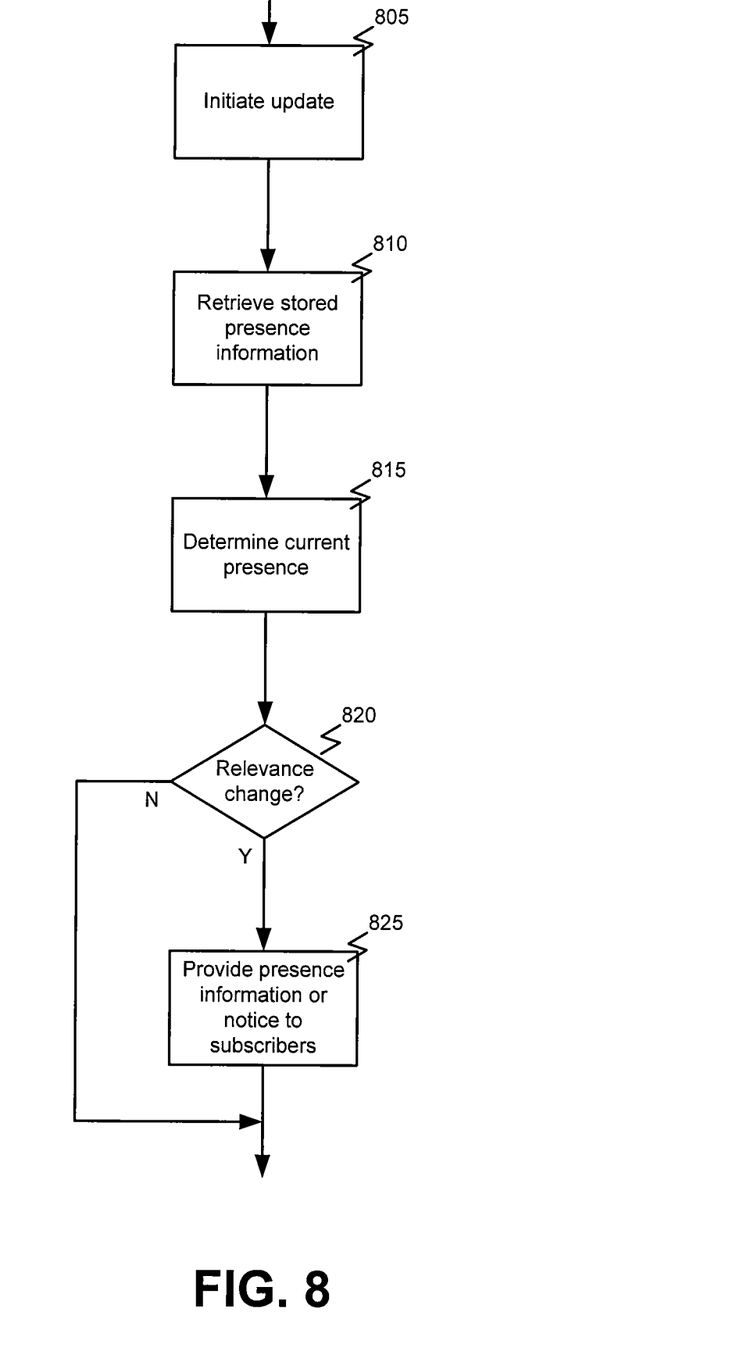
FIG. 8 is a flowchart illustrating a process for using past presence information according to yet another embodiment of the present invention.

FIG. 8 is a flowchart illustrating a process for using past presence information according to yet another embodiment of the present invention. In this example, instead of receiving presence requests, subscribers are notified, for example by the presence enabler, whenever there is a relevant change to the presence information. Such change may be a real time presence change or a change to past, stored presence information due to changed relevance or because of a timer or of other consideration like another request the presence enabler has queried again and received an update (of the state or of the relevance).

In this example, updating presence information can be initiated 805 as noted above based on a timer, new presence information being available, or on the occurrence of some other event or satisfaction of some other condition. The stored presence information related to one or more principals can be retrieved 810 from, for example the repository of past presence information described above. Additionally or alternatively, a current presence for the principal(s) can also be determined 815. That is, in addition to the saved past presence information, the presence enabler, presence server, or other device or application can, as discussed above, collect real-time presence information for principal indicated in the request by querying the plurality of devices in the conventional manner.

Once the presence information has been retrieved, a determination 820 can be made as to whether the relevance of the stored presence information has changed. That is, based on attributes of the stored presence information, the time since the presence information was collected, the new presence information, if any, or other criteria or information, a relevance for the information can be determined. If 820 the relevance of the presence information has changed, the new presence information or the updated attributes of the presence information can be provided to one or more subscribers. Alternatively or additionally, rather than providing the updated presence information and/or attributes, a notification can be sent to the subscribers that the relevance of the presence information has changed. In such a case, the subscribers may request updated presence information as discussed above.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of determining presence of a principal on one or more devices or communication channels, the method comprising:
   determining a presence attribute of the principal at a presence server based at least in part on past presence information for the principal;
   storing the determined presence attribute of the principal by the presence server as a past presence attribute of a plurality of past presence attributes, each of the plurality of past presence attributes indicating a past presence of the principal;
   determining with the presence server a relevance of each the stored past presence attributes;
   storing the determined relevance as a relevance attribute of each stored past presence attribute;

receiving at the presence server a request for a presence of the principal after determining the presence attribute of the principal, storing the past presence attribute of the principal, and determining the relevance of each the stored past presence attributes;

retrieving by the presence server the stored past presence attributes and the stored relevance attributes for the principal;

determining by the presence server a current presence of the principal in real time in response to the request, wherein the stored past present attributes indicate presence of the principal at a time prior to a time of the current presence;

determining by the presence server an order for the retrieved past presence attributes based on the relevance attribute of each retrieved past presence attribute; and providing in response to the request for the presence of the principal the current presence of the principal, two or more of the retrieved past presence attributes indicating the past presence of the principal, and the retrieved relevance attributes of each of the stored presence attributes from the presence server, wherein the two or more of the retrieved past presence attributes are presented in the determined order.

2. The method of claim 1, wherein determining the presence attribute of the principal comprises querying a plurality of end devices.

3. The method of claim 1, wherein determining the presence attribute of the principal comprises querying a plurality of servers.

4. The method of claim 1, wherein determining the presence attribute of the principal comprises querying a service that interacts with the principal.

5. The method of claim 1, wherein determining the presence attribute of the principal comprises querying a communication channel.

6. The method of claim 1, wherein the past presence attributes include a time at which the presence of the principal was determined.

7. The method of claim 1, wherein storing the determined past presence attribute of the principal comprises storing an identification of the one or more communication channels.

8. The method of claim 1, wherein storing the determined past presence attribute of the principal comprises storing an identification of the one or more devices.

9. The method of claim 1, wherein determining the relevance of the stored past presence attributes is based on a time since each stored past presence attribute was determined.

10. The method of claim 9, wherein determining the relevance of the stored past presence attributes is further based on a device type for each of the one or of the plurality of devices.

11. The method of claim 1, further comprising ordering the stored past presence attributes with the presence server based on relevance.

12. The method of claim 1, further comprising:
in response to a change of the relevance of the past presence attributes, updating one or more subscribers to the past presence attributes.

13. The method of claim 12, wherein determining a relevance of the stored past presence attributes is based on a time since each past presence attribute was determined.

14. The method of claim 13, wherein updating one or more subscribers to the past presence attributes comprises determining new presence attributes and sending the new presence attributes to the one or more subscribers.

15. The method of claim 1, wherein determining the presence of the principal comprises periodically determining the presence of the principal.

16. The method of claim 1, further comprising publishing the stored past presence attributes filtered by preferences to one or more authorized watchers.

17. The method of claim 1, wherein determining by the presence server the current presence of the principal in real time comprises determining the current presence of the principal is not indicated and, in response to determining the current presence of the principal is not indicated, providing in response to the request for the presence of the principal only the two or more of the retrieved past presence attributes indicating the past presence of the principal and the retrieved relevance attributes of each of the stored presence attributes from the presence server.

18. The method of claim 1, further comprising, after providing the current presence of the principal, two or more of the retrieved past presence attributes indicating the past presence of the principal, and the retrieved relevance attributes of each of the stored presence attributes from the presence server, receiving a request to refresh the presence of the principal from a requestor making the received request for the presence of the principal.

19. A method of determining presence of a principal on one or more devices or communication channels, the method comprising:
determining with a presence server a relevance of each of a plurality of past presence attributes related to a principal stored at the presence server and indicating a past presence of the principal on one or more of a plurality of devices;

storing the determined relevance as a relevance attribute of each stored past presence attribute;

receiving at the presence server a request for a presence of the principal after determining the relevance of each past presence attribute and storing the determined relevance;

retrieving with the presence server the plurality of past presence attributes and relevance attributes stored by the presence server and related to the principal;

determining by the presence server a current presence of the principal in real time in response to the request, wherein the plurality of past present attributes indicate presence of the principal at a time prior to a time of the current presence;

determining with the presence server an order for the retrieved plurality of past presence attributes based on the relevance attributes of each stored presence attribute; and providing in response to the request for the presence of the principal the current presence of the principal, two or more of the retrieved past presence attributes related to the principal and indicating the past presence of the principal, and the relevance attributes of each of the plurality of past presence attributes, wherein the two or more of the retrieved past presence attributes are provided from the presence server in the determined order.

20. The method of claim 19, wherein determining the relevance of the stored past presence attributes is based on a time since each stored past presence attributes was determined.

21. The method of claim 20, wherein determining the relevance of the stored past presence attributes is further based on a device type for each of the one or more devices.

22. The method of claim 19, wherein receiving the request for the presence of the principal comprises periodically receiving the request for the presence of the principal.

23. A system for determining presence of a principal on one or more devices or communication channels, the system comprising:
   a repository; and
   a presence enabler of a presence server communicatively coupled with the repository and adapted to determine a presence of the principal, receive an indication of the presence of the principal, and store a plurality of past presence attributes related to the indication of the presence of the principal in the repository and indicating a past presence for the principal and wherein the presence enabler is further adapted to periodically determine a relevance of each of the stored past presence attributes, store the determined relevance as a relevance attribute of each past presence attribute, and in response to a change of the relevance of the past presence attributes, determine an order for the past presence attributes based on the relevance attribute of each past presence attribute determine a current presence of the principal in real time in response to the request, wherein the plurality of past present attributes indicate presence of the principal at a time prior to a time of the current presence, and provide the current presence of the principal, two or more stored past presence attributes indicating the past presence of the principal, and stored relevance attributes of each past presence attribute to one or more subscribers to the presence attributes, wherein the two or more of the retrieved past presence attributes are provided in the determined order.

24. The system of claim 23, wherein the presence enabler determines a relevance of the stored past presence attributes based on a time since each past presence attribute was determined.

25. The system of claim 24, wherein the presence enabler updates one or more subscribers to the past presence attributes by determining new presence attributes, determining a relevance for each of the presence attributes including the new presence attributes, and sending the new presence attributes, the past presence attributes, relevance of each of the new presence attributes, and relevance of each of the past presence attribute to the one or more subscribers.

26. The system of claim 23, wherein the presence enabler determines the presence of the principal by querying a plurality of end devices.

27. The system of claim 23, wherein the presence enabler determines the presence of the principal by querying a plurality of servers.

28. The system of claim 23, wherein the presence enabler determines the presence of the principal by querying a service that interacts with the principal.

29. The system of claim 23, wherein the presence enabler determines the presence of the principal by querying a communication channel.

30. The system of claim 23, wherein the past presence attributes include a time at which the presence of the principal was determined.

31. The system of claim 23, wherein the presence enabler stores past presence attributes related to the indication of the presence of the principal including storing an identification of the one or more communication channels.

32. The system of claim 23, wherein the presence enabler stores past presence attributes related to the indication of the presence of the principal including storing an identification of the one or more devices.

33. The system of claim 23, wherein the presence enabler is further adapted to receive a request for a presence of the principal and retrieve the stored past presence attributes.

34. The system of claim 33, wherein the presence enabler is further adapted to provide the stored past presence attributes in response to the request for the presence of the principal.

35. The system of claim 23, wherein the presence enabler is further adapted to determine a relevance of the stored past presence attributes and providing the relevance with the stored past presence attributes in response to the request for the presence of the principal.

36. The system of claim 35, wherein the presence enabler determines the relevance of the stored past presence attributes based on a time since each presence attribute was determined.

37. The system of claim 36, wherein the presence enabler determines the relevance of the stored past presence attributes further based on a device type for each of the one or more of the plurality of devices.

38. The system of claim 23, wherein the presence enabler is further adapted to periodically determine the presence of the principal.

* * * * *

UNITED STATES PATENT AND TRADEMARK OFFICE
CERTIFICATE OF CORRECTION

| | | |
|---|---|---|
| PATENT NO. | : 8,804,573 B2 | Page 1 of 1 |
| APPLICATION NO. | : 11/424451 | |
| DATED | : August 12, 2014 | |
| INVENTOR(S) | : Maes | |

It is certified that error appears in the above-identified patent and that said Letters Patent is hereby corrected as shown below:

On the Title Page

On page 2, column 2, under Other Publications, line 3, delete "www.ubiquitysfotware.com," and insert -- www.ubiquitysoftware.com, --, therefor.

Signed and Sealed this
Nineteenth Day of May, 2015

Michelle K. Lee
*Director of the United States Patent and Trademark Office*